US010144310B1

(12) United States Patent
Ferenc et al.

(10) Patent No.: US 10,144,310 B1
(45) Date of Patent: Dec. 4, 2018

(54) ADJUSTMENT DEVICE FOR ADJUSTING A LONGITUDINAL POSITION OF A VEHICLE SEAT

(71) Applicant: Brose Fahrzeugteile GmbH & Co. KG, Coburg, Coburg (DE)

(72) Inventors: Anthony Ferenc, Goodrich, MI (US); Umesh Handigol, Rochester, MI (US); Anil Bhat, Rochester Hills, MI (US)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 0 days.

(21) Appl. No.: 15/612,402

(22) Filed: Jun. 2, 2017

(51) Int. Cl.
*B60N 2/00* (2006.01)
*B60N 2/06* (2006.01)
*B60N 2/07* (2006.01)

(52) U.S. Cl.
CPC ............. *B60N 2/067* (2013.01); *B60N 2/07* (2013.01); *B60N 2/0715* (2013.01)

(58) Field of Classification Search
CPC . B60N 2/06; B60N 2/067; B60N 2/07; B60N 2/0702; B60N 2/0715
USPC .................. 248/424, 429; 297/344.1, 344.11
See application file for complete search history.

(56) References Cited

U.S. PATENT DOCUMENTS

| | | | | |
|---|---|---|---|---|
| 7,407,214 B2* | 8/2008 | Long | ...................... | B60N 2/067 248/429 |
| 2006/0237987 A1* | 10/2006 | Nakamura | ........... | B60N 2/0232 296/65.13 |
| 2007/0157751 A1* | 7/2007 | Woehrle | ................. | B60N 2/067 74/27 |
| 2012/0168595 A1* | 7/2012 | Gray | ..................... | B60N 2/0818 248/429 |
| 2012/0181408 A1* | 7/2012 | Matsushima | ........ | B60N 2/0705 248/429 |
| 2016/0059739 A1* | 3/2016 | Tsuji | .................... | B60N 2/0705 248/429 |

* cited by examiner

*Primary Examiner* — Steven M Marsh
(74) *Attorney, Agent, or Firm* — Lewis Roca Rothgerber Christie LLP

(57) ABSTRACT

An adjustment device for adjusting a longitudinal position of a vehicle seat comprises a first guide rail, a spindle extending along a longitudinal axis, a holding device connecting the spindle to the first guide rail, a second guide rail being linearly movable along the longitudinal axis with respect to the first guide rail, and a gearing fixed to the second guide rail, the gearing being in operative connection with the spindle to move the second guide rail relative to the first guide rail. The holding device herein comprises a body fixed to the first guide rail and made from a plastics material. In this way an adjustment device is provided which may reduce the complexity in particular of the fixation of the spindle to its associated, first guide rail.

12 Claims, 3 Drawing Sheets

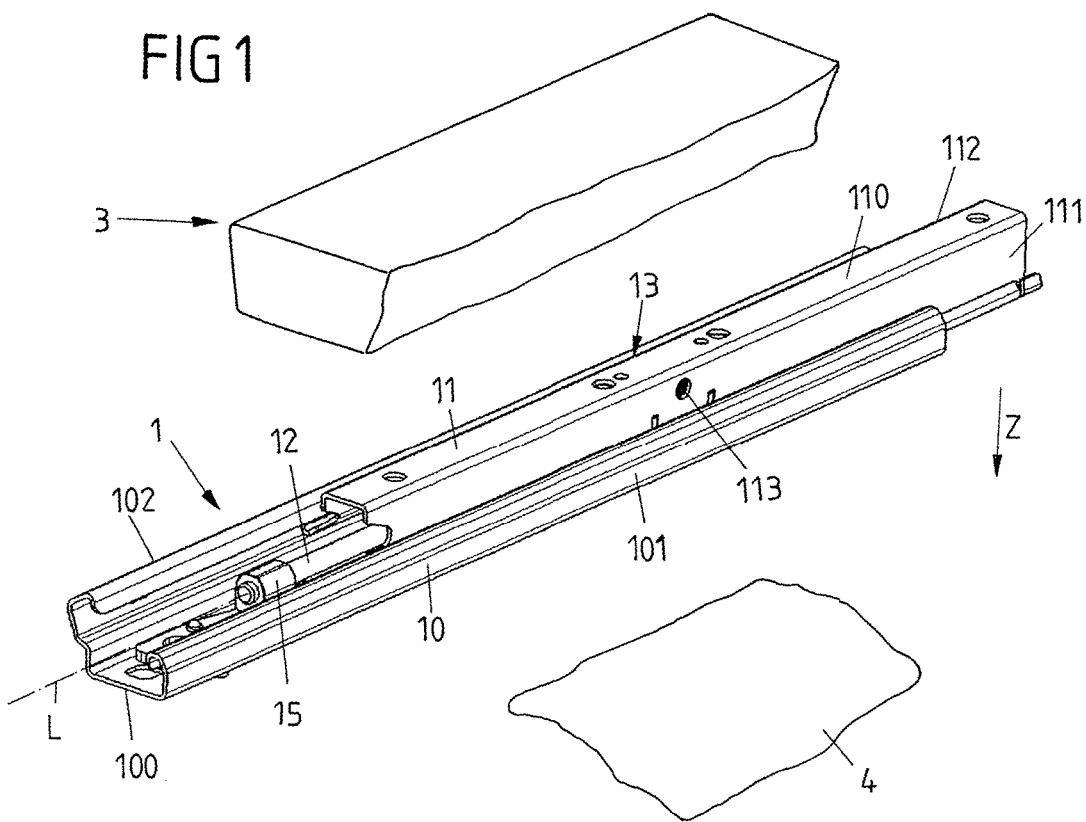
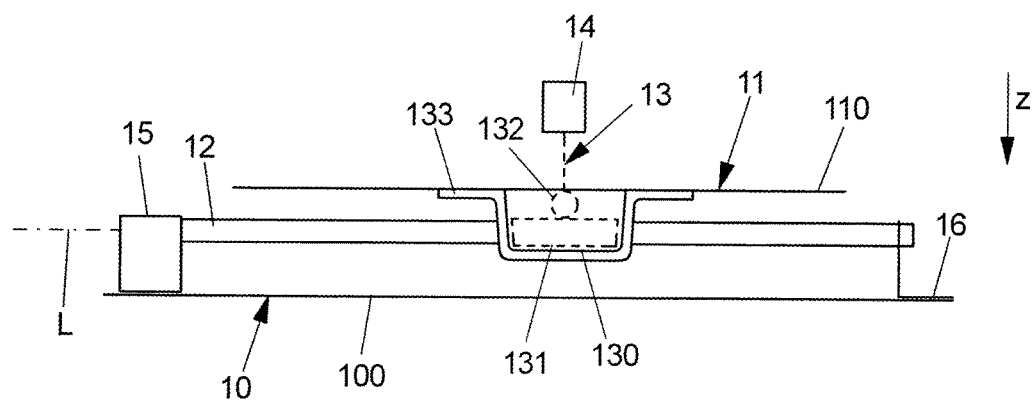

ADJUSTMENT DEVICE FOR ADJUSTING A LONGITUDINAL POSITION OF A VEHICLE SEAT

TECHNICAL FIELD

The invention relates to an adjustment device for adjusting a longitudinal position of a vehicle seat.

BACKGROUND

Within a vehicle the position of a vehicle seat can be adjusted by means of an adjustment device comprising guide rails, an upper guide rail being slidably arranged on a lower guide rail such that the vehicle seat connected to the upper guide rail can be adjusted in its longitudinal position within the vehicle by sliding the upper guide rail along the lower guide rail for example connected to a vehicle floor.

An adjustment device of this kind may for example comprise a spindle fixed to a first of the guide rails and being in operative connection with a gearing fixed to a second of the guide rails. The gearing for example comprises a spindle nut driven by an electric drive device such that by rotating the spindle nut with respect to the spindle the gearing (and together with the gearing the second guide rail) can be moved longitudinally along the spindle.

The guide rails of the adjustment device hence are held in position with respect to each other via the gearing being in operative connection with the spindle. The gearing herein is fixed to the second guide rail such that forces can be transferred from the gearing to the second guide rail and from the second guide rail to the vehicle seat in order to adjust the position of the vehicle seat.

To be able to transfer forces between the guide rails in order to adjust the longitudinal seat position and also to securely hold the vehicle seat in place in case of abnormal loads, for example in case of a vehicle crash, the spindle needs to be reliably fastened to the first guide rail. Typically, this is achieved by means of holding devices in the shape of metal holding brackets, which for example may be welded or riveted to the first guide rail, for example to a base of the first guide rail such that via the holding devices a fixation of the spindle with respect to the first guide rail is established. This type of attachment typically requires multiple parts and adds to the assembly process, the cycle time and the cost of the product.

SUMMARY OF THE INVENTION

It is an object of the instant invention to provide an adjustment device which may reduce the complexity in particular of the fixation of the spindle to its associated, first guide rail.

According to one aspect, an adjustment device for adjusting a longitudinal position of a vehicle seat comprises a first guide rail, a spindle extending along a longitudinal axis, a holding device connecting the spindle to the first guide rail, a second guide rail being linearly movable along the longitudinal axis with respect to the first guide rail, and a gearing fixed to the second guide rail, the gearing being in operative connection with the spindle to move the second guide rail relative to the first guide rail. Herein, the holding device comprises a body fixed to the first guide rail and made from a plastics material.

According to another aspect, the body may have a block shape.

According to yet another aspect, the body may be made from a plastics material comprising an elastomer.

In a particular embodiment, the holding device may comprise an insert element fixed to the body, the insert element for example being overmolded with the material of the body.

In one embodiment, the body is made from a first plastics material, whereas the insert element is made from a second plastics material differing from the first plastics material. For example, the first plastics material may have a first elastic modulus, and the second plastics material may have a second elastic modulus, the first elastic modulus being smaller than the second elastic modulus.

BRIEF DESCRIPTION OF THE DRAWINGS

Various features and advantages of the present invention may be more readily understood with reference to the following detailed description and the embodiments shown in the drawings. Herein, FIG. 1 shows a perspective view of an embodiment of an adjustment device adapted to longitudinally adjust the position of a vehicle seat; and FIG. 2 shows a schematic view of the functional operation of the adjustment device.

DETAILED DESCRIPTION

Figure 3:
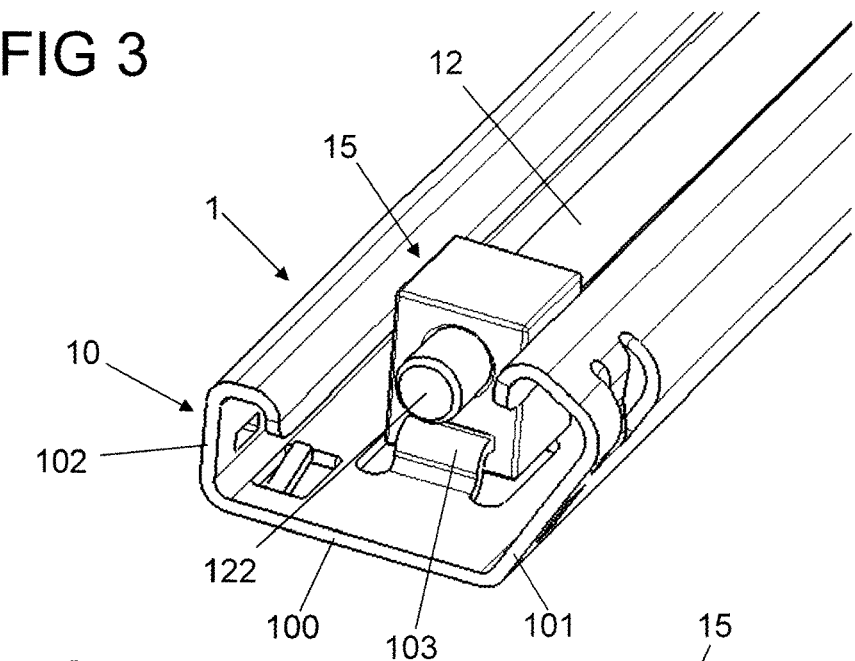
FIG. 3 shows a view of a holding device of an adjustment device to fix a spindle to an associated, first guide rail, according to a first embodiment.

Subsequently, embodiments of the invention shall be described in detail with reference to the drawings. In the drawings, like reference numerals designate like structural elements.

It is to be noted that the embodiments shall not be limiting for the invention, but merely represent illustrative examples.

FIG. 1 shows an embodiment of an adjustment device 1 adapted to longitudinally adjust the position of a vehicle seat 3 (which is only schematically indicated in FIG. 1) relative to a vehicle floor 4 (which also is only schematically indicated in FIG. 1). By means of the adjustment device 1 the position of the vehicle seat 3 may be adjusted along a longitudinal axis L such that a user may slidably adjust the seating position within the vehicle.

The adjustment device 1, as generally known, comprises two pairs of guide rails, each pair comprising a first guide rail 10 which is directly or indirectly connected to the vehicle floor 4. A second, upper guide rail 11 is slidably arranged on the first guide rail 10 and may be moved relative to the first guide rail 10 along the longitudinal axis L along which both the first guide rail 10 and the second guide rail 11 extend. The vehicle seat 3 may be, directly or indirectly for example via a height adjustment mechanism, connected to the second, upper guide rail 11 such that by moving the second guide rail 11 relative to the first guide rail 10 the longitudinal position of the vehicle seat 3 may be adjusted.

The adjustment device 1, in the shown embodiment, is constituted as an electric adjustment device for motorically adjusting the longitudinal position of the vehicle seat 3. For this, a spindle 12, via holding devices 15, 16, is connected to a base 100 of the first guide rail 10 such that the spindle 12 is held relative to the first guide rail 10 in a fixed, torque-proof manner. The spindle 12 is received between legs 101, 102 of the generally U-shaped first guide rail 10, the second guide rail 11 being slidably arranged in between the legs 101, 102 of the first guide rail 10 using for example ball bearings or the like.

The second, upper guide rail 11 comprises a base 110 and legs 111, 112 and, via the legs 111, 112, is slidably guided within the first, lower guide rail 10.

As schematically indicated in FIG. 2, a gearing 13 is fixed to the second guide rail 11 and is held in place with respect to the second guide rail 11 by means of a holding bracket 133. The gearing 13 comprises a housing 130 which is fitted into the holding bracket 133 and encloses a spindle nut 131 being in threaded engagement with a screw thread of the spindle 12 such that, by rotating the spindle nut 131, the gearing 13—and together with the gearing 13 the second guide rail 11—can be moved longitudinally along the spindle 12 in order to adjust the longitudinal position of the vehicle seat 3.

The gearing 13 furthermore comprises a drive worm 132 reaching through an opening 113 in the leg 111 of the upper guide rail 11 and carrying a worm thread which engages with an outer toothing of the spindle nut 131 and may be driven by means of a drive device 14 in the shape of an electric motor in order to rotate the spindle nut 131 within the housing 130.

During operation, the drive device 14 electrically drives the drive worm 132, by which the spindle nut 131 is rotated about the spindle 12. Via the threaded engagement of an inner toothing of the spindle nut 131 with the outer toothing of the spindle 12, the gearing 13 is moved longitudinally along the spindle 12 such that the second guide rail 11 slides along the lower, first guide rail 10 and accordingly moves the vehicle seat 3 relative to the vehicle floor 4.

To be able to transfer forces between the guide rails 10, 11 for adjusting the longitudinal position of the vehicle seat and to securely hold the vehicle seat in place also in case of abnormal loads, for example in case of a crash, the spindle 12 must be securely fastened to the first, lower guide rail 10. This is achieved by the holding devices 15, 16, which serve to fix the spindle 12 at its front end and at its back end to the base 100 of the first, lower guide rail 10.

Whereas the holding device 16 placed for example at the back end of the spindle 12 may be formed by a metal bracket and may be fixed to the base 100 of the first guide rail 10 for example by welding or by riveting, the other holding device 15 placed for example at the front end of the spindle 12 may be formed as a plastics part. This is based on the finding that one of the holding devices may have a simplified shape and construction, substantial loads in particular in case of a crash being absorbed by the other holding device. It hence may be sufficient to form one of the holding devices to serve as an isolator to support the spindle 12 in its height position along the vertical axis Z and to reduce vibrations and buzz, squeak and rattle (BSR) noise by acoustically isolating the spindle 12 from the associated guide rail 10. Because one of the holding devices may have a simplified construction, the number of required parts may be reduced, thus helping to render the assembly process more efficient and to reduce the cycle time and the cost of the product.

In one aspect, a holding device 15 of simplified construction may comprise a body fixed to the associated, first guide rail 10, the body being made from a plastics material. The body for example may have a block shape, and the plastics material may comprise an elastomer. By using a body of this kind being formed from a plastics material, in particular an elastomeric material, an acoustic isolation between the spindle and the associated first guide rail can be established.

Herein, the holding device 15 serves to support the spindle 12 with respect to the first guide rail 10 in its vertical height position. A substantial amount of the longitudinal load forces, in particular in case of a crash, herein may be absorbed by the other holding device 16, which may be formed by a metal bracket welded or riveted to the base 100 of the guide rail 10.

Figure 4:
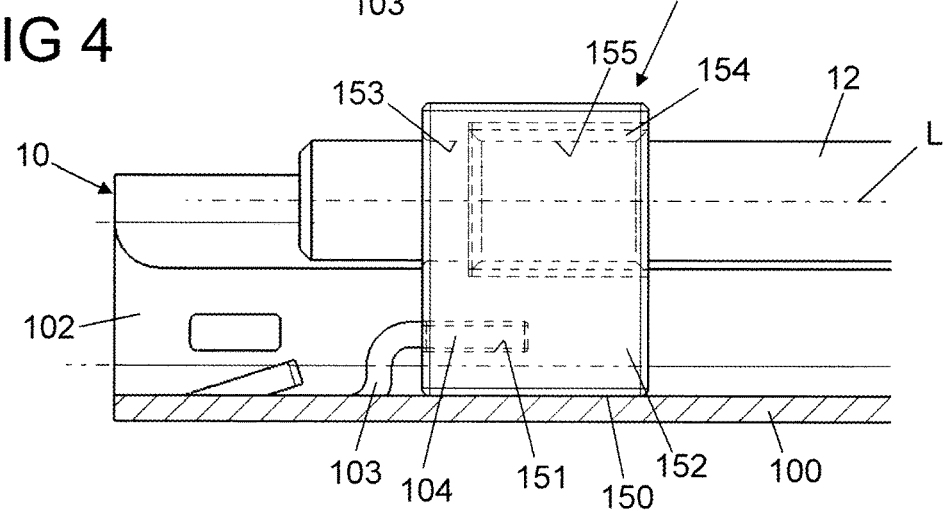
FIG. 4 shows a partially cut view of the arrangement of FIG. 3.
Figure 5:
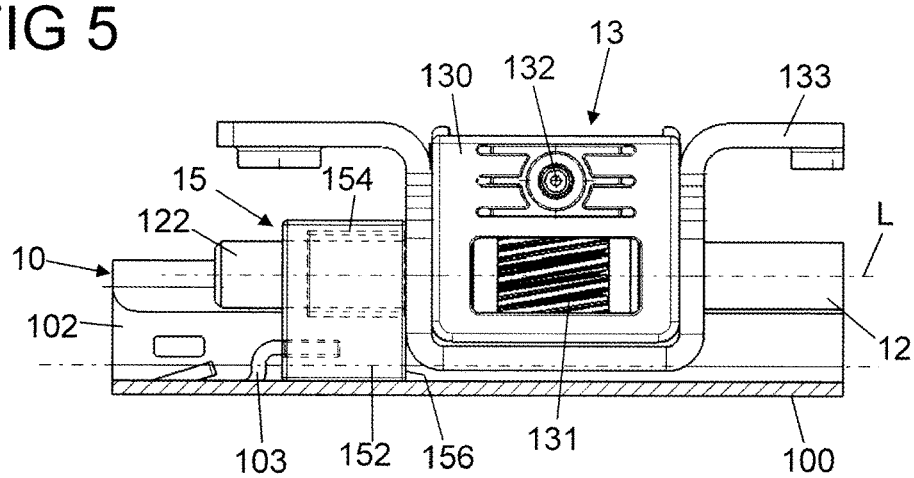
FIG. 5 shows a partially cut view illustrating the holding device functioning as an end stop to limit a longitudinal movement of a gearing of the adjustment device.

One embodiment of a holding device 15 is shown in FIGS. 3 to 5. In this embodiment, the holding device 15 has a block shape comprising a body 152, the body 152 comprising a bottom face 150 resting on the base 100 of the first, lower guide rail 10.

In one aspect, the body 152 comprises an opening 153 through which the spindle 12 reaches.

In another aspect, an insert element 154 is received within the body 152 and is overmolded with the plastics material of the body 152. The insert element 154 hence is integrally connected to the body 152, the insert element 154 having the shape of a cylindrical bushing aligned with the opening 153 of the body 152 and comprising a threading 155 which is in engagement with an outer threading of the spindle 12. The spindle 12 is screwed into the insert element 154 with an end 122 such that the spindle 12 is fixedly connected to the insert element 154 and via the insert element 154 to the body 152.

In one aspect, the body 152 and the insert element 154 of the holding device 15 may both be made from plastics material. Herein, in one embodiment, the body 152 and the insert element 154 may be made from different plastics material. For example, the body 152 may be made from a plastics material comprising an elastomer. The insert element 154 in turn may be made from another plastics material not comprising an elastomer.

In one embodiment, the body 152 and the insert element 154 comprise different elastic characteristics. In particular, the body 152 may be made from a plastics material having a first elastic modulus, whereas the insert element 154 may be made from a plastics material having a second elastic modulus smaller than the first elastic modulus. The insert element 154 hence is made from a more rigid material, the material of the body 152 being softer than the material of the insert element 154. In this way, on the one hand a secure fastening of the spindle 12 to the holding device 15 via the insert element 154 can be achieved. On the other hand, by means of the comparatively soft material of the body 152 an improved acoustic isolation of the spindle 12 and the guide rail 10 is achieved, facilitating the reduction of noise and vibrations.

In another aspect, the holding device 15 is fixed to the base 100 of the associated first, lower guide rail 10 by means of a fixing element 103 having an end section 104 engaging with an opening 151 of the body 152. The fixing element 103 protrudes from the base 100 of the guide rail 10 and is cut free from the base 100 in a tongue-like manner, as visible for example from FIG. 3. The end section 104 herein extends along the longitudinal direction L and hence extends in parallel to the base 100.

For the assembly, the holding device 15 may be preassembled on the spindle 12. To fix the holding device 15 on the guide rail 10, the holding device 15 may be slid onto the end section 104 of the fixing element 103 such that the end section 104 engages with the opening 151 of the body 152. In this way the holding device 15 is caught on the base 100 of the guide rail 10 by means of the fixing element 103.

Referring now to FIG. 5, in another aspect the holding device 15 may serve as an end stop for the longitudinal adjustment movement of the guide rails 10, 11 with respect to each other. For this, the body 152, by means of a stop face 156 extending transversely to the longitudinal direction L, may provide an end stop for the movement of the gearing 13 attached to the second, upper guide rail 11 such that the gearing 13 may not be moved beyond the holding device 15, as illustrated in FIG. 5.

The holding device 15 serves to support the spindle 12 with respect to the guide rail 10 at one end 122 of the spindle 12. At the other hand, as schematically shown in FIG. 2, the holding device 16 (for example in the shape of a metal bracket) fixedly and in a torque-proof manner connects the spindle 12 to the guide rail 10. The spindle 12 in this way is fixed to the holding device 16 such that via the holding device 16 a secure fixation of the spindle 12 to the first, lower guide rail 10 is established, in particular suitable to receive and absorb also loads in an abnormal load situation, in particular during a crash.

Figure 6:
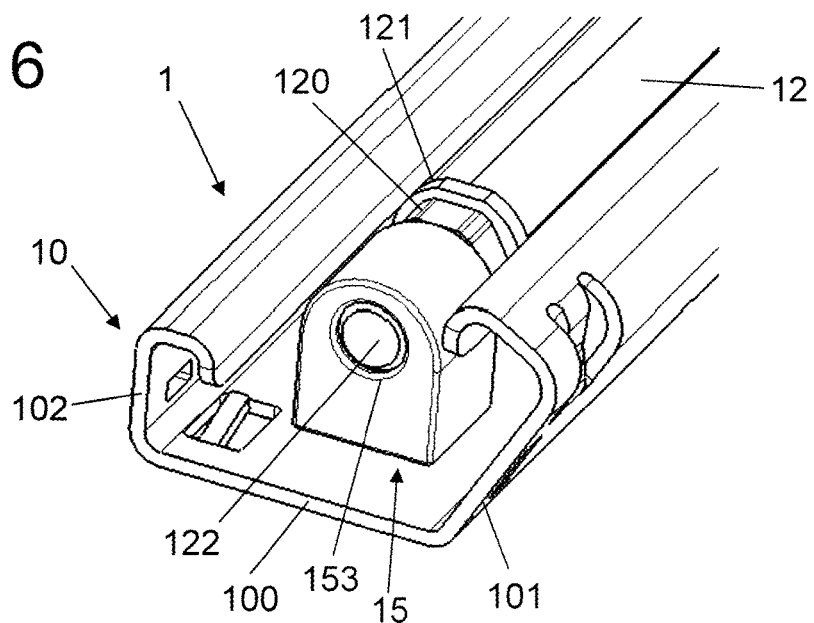
FIG. 6 shows a view of a holding device of an adjustment device to fix a spindle to an associated, first guide rail, according to another embodiment.
Figure 7:
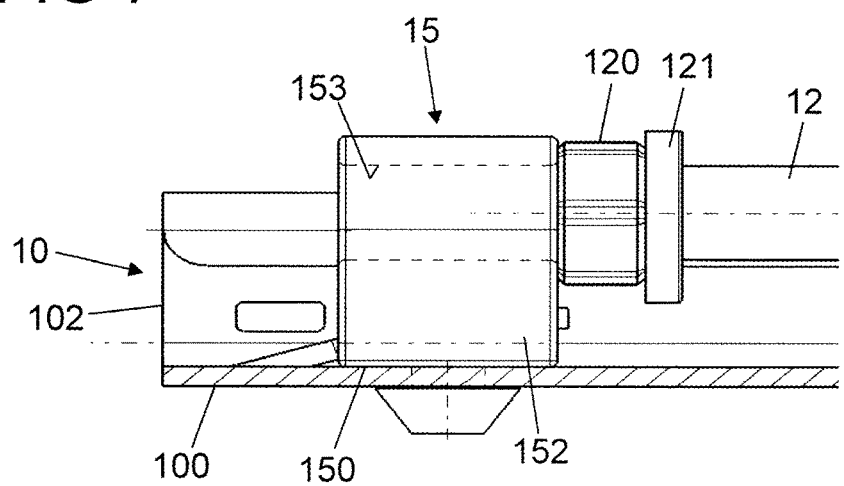
FIG. 7 shows a partially cut view of the arrangement of FIG. 6.

Now referring to FIGS. 6 and 7, in another embodiment the holding device 15 may comprise a body 152 being made from a plastics material, in particular an elastomer material, and having an opening 153 in the shape of a through hole through which the spindle 12 extends. The body 152 with a bottom face 150 is placed on the base 100 of the associated first, lower guide rail 10 and in this way is fixed to the first guide rail 10, for example by riveting or in the manner described with reference to FIGS. 3 to 5.

In the embodiment of FIGS. 6 and 7, the holding device 15 for example does not comprise an insert element, but the spindle 12 with an end 122 merely reaches through the opening 153 in the shape of a through hole. Hence, no longitudinal support of the spindle 12 within the opening 153 of the holding device 15 is provided.

In order to support the spindle 12 longitudinally on the holding device 15, according to one aspect the spindle 12 comprises a nut element 120 screwed onto the spindle 12. The nut element 120 abuts the body 152 of the holding device 15 and hence provides for a longitudinal support of the spindle 12 with respect to the holding device 15. An elastic bearing 121 provides for an elastic end stop to limit the longitudinal movement of the guide rails 10, 11 with respect to each other. In particular, in an end position the gearing 13 by means of the holding bracket 133 may come into abutment with the elastic bearing 121.

The embodiments described above shall not limit the invention, but merely serve for illustrative purposes.

In particular, components of the longitudinal adjustment device may have an entirely different shape and construction.

For example, the gearing, including the fixation of the gearing to its associated second guide rail, may have a different shape and construction than described herein.

REFERENCE NUMERALS

1 Longitudinal adjustment device
10, 11 Guide rail
100, 110 Base
101, 102, 111, 112 Leg
103 Fixing element
104 End
113 Opening
12 Spindle
120 Nut element
121 Spring bearing
122 End
13 Gearing
130 Housing
131 Spindle nut
132 Drive worm
133 Holding bracket
14 Drive device
15, 16 Holding device
150 Bottom face
151 Opening
152 Body
153 Through hole
154 Insert element
155 Threading
156 Stop face
3 Vehicle seat
4 Vehicle floor
L Longitudinal axis
Z Vertical direction

The invention claimed is:

1. An adjustment device for adjusting a longitudinal position of a vehicle seat, the adjustment device comprising:
   a first guide rail;
   a spindle extending along a longitudinal axis;
   a holding device connecting the spindle to the first guide rail;
   a second guide rail being linearly movable along the longitudinal axis with respect to the first guide rail; and
   a gearing fixed to the second guide rail, the gearing being in operative connection with the spindle to move the second guide rail relative to the first guide rail;
   wherein the holding device comprises:
      a body fixed to the first guide rail and made from a plastics material; and
      an insert element embedded into the body, the insert element defining a bore comprising a threading wherein the spindle engages with the threading and wherein the insert element is made from a material different than the plastics material of the body, the plastics material of the body having a first elastic modulus and the material of the insert element having a second elastic modulus, the first elastic modulus being smaller than the second elastic modulus.

2. The adjustment device of claim 1, wherein the body has a block shape.

3. The adjustment device of claim 1, wherein the body is made from a plastics material comprising an elastomer.

4. The adjustment device of claim 1, wherein the body comprises an opening, the spindle engaging with said opening.

5. The adjustment device of claim 1, wherein the insert element is overmolded with the material of the body.

6. The adjustment device of claim 1, wherein the body is made from a first plastics material and the insert element is made from a second plastics material differing from the first plastics material.

7. The adjustment device of claim 1, wherein the spindle comprises a nut element abutting the holding device for longitudinally supporting the spindle with respect to the holding device.

8. The adjustment device of claim 1, wherein the first guide rail comprises a base and at least one leg extending from the base, wherein the holding device is fixed to the base.

9. The adjustment device of claim 1, wherein the first guide rail comprises a fixing element protruding from the base and engaging with the body of the holding device.

10. The adjustment device of claim 9, wherein the fixing element comprises an end section extending along the longitudinal direction and engaging with the body.

11. The adjustment device of claim 1, wherein the holding device connects the spindle to the first guide rail at a first end of the spindle and another, second holding device connects the spindle to the first guide rail at a second end of the spindle.

12. An adjustment device for adjusting a longitudinal position of a vehicle seat, the adjustment device comprising:
    a first guide rail;
    a spindle extending along a longitudinal axis;
    a first holding device and a second holding device connecting the spindle to the first guide rail;
    a second guide rail being linearly movable along the longitudinal axis with respect to the first guide rail; and
    a gearing fixed to the second guide rail, the gearing being in operative connection with the spindle to move the second guide rail relative to the first guide rail;
   wherein the first holding device comprises a body fixed to the first guide rail and made from a plastics material, the first holding device being formed to support the spindle with respect to the first guide rail in its vertical height position and to acoustically isolate the spindle from the first guide rail,
   wherein the second holding device is formed by a metal bracket fixed to the first guide rail, the second holding device being formed to absorb loads acting onto the spindle in case of a crash.

* * * * *